US012326808B2

(12) United States Patent
Yuan et al.

(10) Patent No.: US 12,326,808 B2
(45) Date of Patent: Jun. 10, 2025

(54) FLASH MEMORY CONTROLLER AND ASSOCIATED CONTROL METHOD

(71) Applicant: Silicon Motion, Inc., Hsinchu County (TW)

(72) Inventors: Kuo-Han Yuan, Hsinchu County (TW); Cheng-Yu Tsai, Kaohsiung (TW)

(73) Assignee: Silicon Motion, Inc., Hsinchu County (TW)

( * ) Notice: Subject to any disclaimer, the term of this patent is extended or adjusted under 35 U.S.C. 154(b) by 0 days.

(21) Appl. No.: 18/623,055

(22) Filed: Apr. 1, 2024

(65) Prior Publication Data

US 2024/0345950 A1 Oct. 17, 2024

(30) Foreign Application Priority Data

Apr. 14, 2023 (TW) .................................. 112113996

(51) Int. Cl.
*G06F 12/02* (2006.01)
(52) U.S. Cl.
CPC ................................. *G06F 12/0246* (2013.01)
(58) Field of Classification Search
CPC .. G06F 12/0246; G06F 13/1668; G11C 16/32
See application file for complete search history.

(56) References Cited

U.S. PATENT DOCUMENTS

| | | | |
|---|---|---|---|
| 11,249,926 B1* | 2/2022 | Han | G06F 13/24 |
| 11,397,699 B2* | 7/2022 | Benisty | G06F 13/24 |
| 2013/0219088 A1 | 8/2013 | Rawe | |
| 2017/0075834 A1* | 3/2017 | Cha | G06F 3/0655 |
| 2019/0278523 A1 | 9/2019 | Benisty | |
| 2022/0156208 A1* | 5/2022 | Benisty | G06F 21/78 |

FOREIGN PATENT DOCUMENTS

| | | |
|---|---|---|
| CN | 110659122 A | 1/2020 |
| TW | 202125270 A | 7/2021 |

* cited by examiner

*Primary Examiner* — Tasnima Matin
(74) *Attorney, Agent, or Firm* — Winston Hsu (57) ABSTRACT

The present invention provides a control method of a flash memory controller, which includes the steps of: setting a waiting time in an interrupt coalescing mechanism, and setting a timer, wherein a timeout value of the timer is equal to the waiting time; receiving multiple commands from a submission queue in a host device, generating multiple command responses after processing the multiple commands, and writing the multiple command responses to a completion queue in the host device; receiving a submission queue tail and a completion queue head from the host device; and when the timer reaches the timeout value, subtracting the completion queue head from the submission queue tail to obtain a queue depth of a command queue of the host device.

10 Claims, 8 Drawing Sheets

FIG. 1

Region A: the number of commands that the host device has sent but the memory device has not yet read from the submission queue.
Region B: the number of commands that the memory device has received but has not yet generated command responses.
Region C: the number of command responses that the memory device has completed, but the host device has not yet read from the completion queue.

FLASH MEMORY CONTROLLER AND ASSOCIATED CONTROL METHOD

BACKGROUND OF THE INVENTION

1. Field of the Invention

The present invention relates to a flash memory controller.

2. Description of the Prior Art

In a current electronic device having a flash memory, when a host device needs to send multiple commands temporarily stored in a command queue (command queue), such as read commands, write commands or management commands, to the flash memory controller for execution, the host device will first write these commands into a submission queue and notify the flash memory controller that there are commands that need to be executed in the submission queue, and then the flash memory controller reads commands from the submission queue to perform related operations. However, since the command queue is located in a memory of the host device, the flash memory controller cannot know a queue depth of the command queue, so the flash memory controller cannot determine the behavior of the host device in sending commands, and cannot take corresponding actions to optimize overall performance.

SUMMARY OF THE INVENTION

It is therefore one of the objectives of the present invention to provide a flash memory controller that can accurately calculate the queue depth of the submission queue at the host device for relevant settings of performance optimization, to solve the problems described in the prior art.

According to one embodiment of the present invention, a flash memory controller is disclosed. The flash memory controller is configured to access a flash memory module, and the flash memory controller comprises a ROM configured to store a program code, and a microprocessor configured to execute the program code to control access of the flash memory module. The microprocessor is configured to perform the steps of: setting a waiting time in an interrupt coalescing mechanism, and setting a timer, wherein a timeout value of the timer is equal to the waiting time; receiving multiple commands from a submission queue in a host device, processing the multiple commands to generate multiple command responses respectively, and writing the multiple command responses to a completion queue in the host device; receiving a submission queue tail and a completion queue head from the host device, wherein the submission queue tail indicates how many commands the host device sends, and the completion queue head indicates how many command responses the host device has read from the completion queue; when the timer reaches the timeout value, subtracting the completion queue head from the submission queue tail to obtain a queue depth of a command queue inside the host device; and when the timer reaches the timeout value, sending an interrupt signal to the host device, wherein the interrupt signal is used to trigger the host device to read the multiple command responses from the completion queue.

According to one embodiment of the present invention, a control method of a flash memory controller comprises the steps of: setting a waiting time in an interrupt coalescing mechanism, and setting a timer, wherein a timeout value of the timer is equal to the waiting time; receiving multiple commands from a submission queue in a host device, processing the multiple commands to generate multiple command responses respectively, and writing the multiple command responses to a completion queue in the host device; receiving a submission queue tail and a completion queue head from the host device, wherein the submission queue tail indicates how many commands the host device sends, and the completion queue head indicates how many command responses the host device has read from the completion queue; when the timer reaches the timeout value, subtracting the completion queue head from the submission queue tail to obtain a queue depth of a command queue inside the host device; and when the timer reaches the timeout value, sending an interrupt signal to the host device, wherein the interrupt signal is used to trigger the host device to read the multiple command responses from the completion queue.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
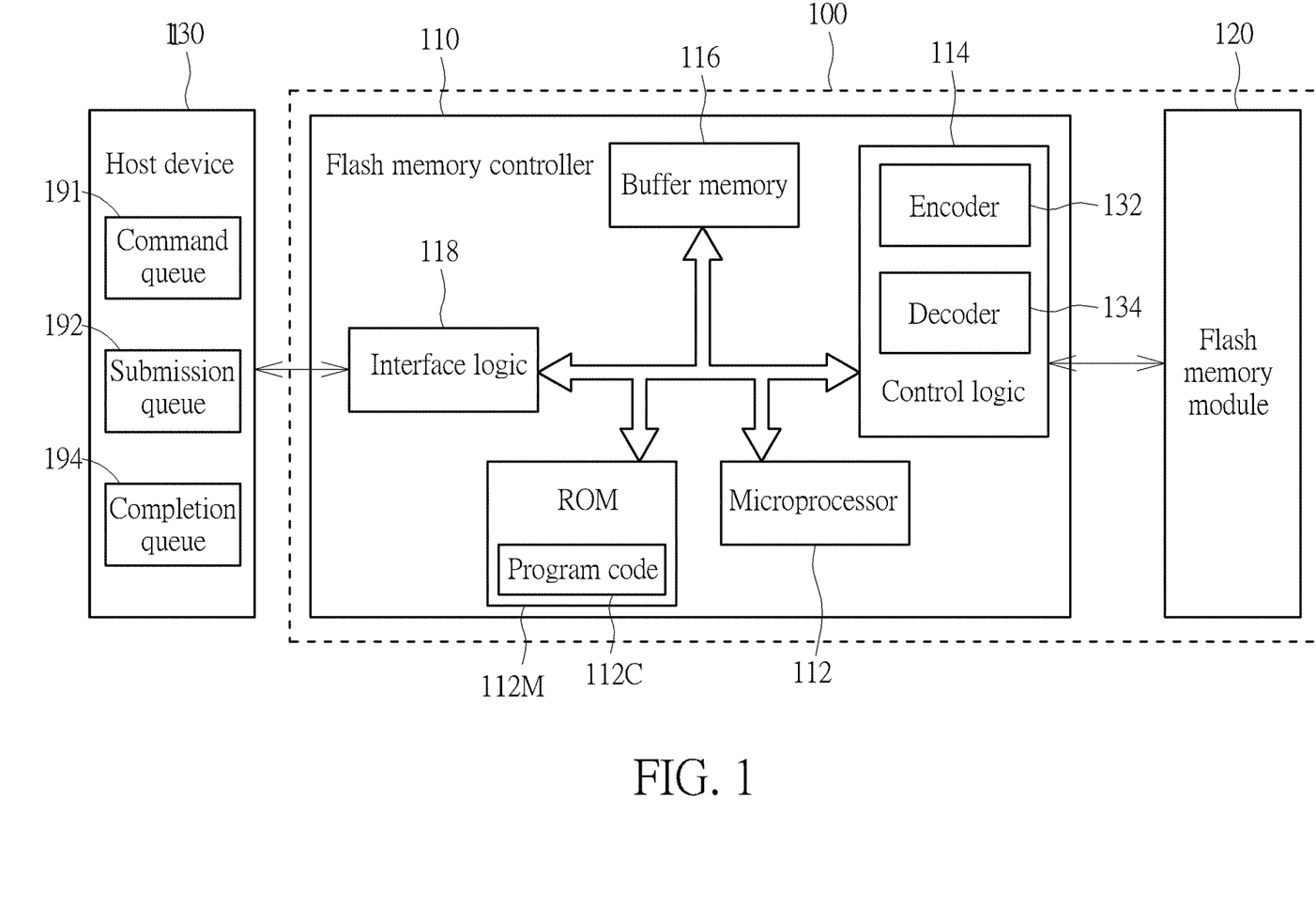
FIG. 1 is a diagram illustrating a memory device according to one embodiment of the present invention.

FIG. 1 is a diagram illustrating a memory device 100 according to one embodiment of the present invention. The memory device 100 includes a flash memory module 120 and a flash memory controller 110, wherein the flash memory controller 110 is arranged to access the flash memory module 120. The flash memory controller 110 includes a microprocessor 112, a read only memory (ROM) 112M, a control logic 114, a buffer memory 116, and an interface logic 118. The ROM 112M is arranged to store a program code 112C, and the microprocessor 112 is arranged to execute the program code 112C to control access of the flash memory module 120. The control logic 114 includes an encoder 132 and a decoder 134, wherein the encoder 132 is arranged to encode data that is written into the flash memory module 120 to generate a corresponding parity (also known as an error correction code (ECC)), and the decoder 134 is arranged to decode data that is read from the flash memory module 120.

In a general situation, the flash memory module 120 includes a plurality of flash memory chips, and each flash memory chip includes a plurality of blocks. A controller (e.g. the flash memory controller 110 that executes the program code 112C through the microprocessor 112) may copy, erase, and merge data for the flash memory module 120 with a block as a unit. In addition, a block can record a specific number of pages, wherein the controller (e.g. the flash memory controller 110 that executes the program code 112C through the microprocessor 112) may perform a data write operation upon the flash memory module 120 with a page as a unit. In other words, a block is the smallest erase unit in the flash memory module 120, and a page is the smallest write unit in the flash memory module 120.

In practice, the flash memory controller 110 that executes the program code 112C through the microprocessor 112 may utilize its own internal components to perform many control operations. For example, the flash memory controller 122 utilizes the control logic 114 to control access of the flash memory module 120 (more particularly, access at least one block or at least one page), utilizes the buffer memory 116 to perform a required buffering operation, and utilizes the interface logic 118 to communicate with a host device 130.

In one embodiment, the memory device 100 may be a portable memory device such as a memory card which conforms to one of the SD/MMC, CF, MS and XD specifications, and the host device 130 is an electronic device able to be connected to the memory device 100, such as a cellphone, a laptop, a desktop computer, etc. In another embodiment, the memory device 100 can be a solid state drive (SSD) or an embedded storage device conforming to the universal flash storage (UFS) or embedded multi-media card (EMMC) specifications, and can be arranged in an electronic device. For example, the memory device 100 can be arranged in a cellphone, a watch, a portable medical testing device (e.g. a medical wristband), a laptop, or a desktop computer. In this case, the host device 130 can be a processor of the electronic device.

Figure 2:
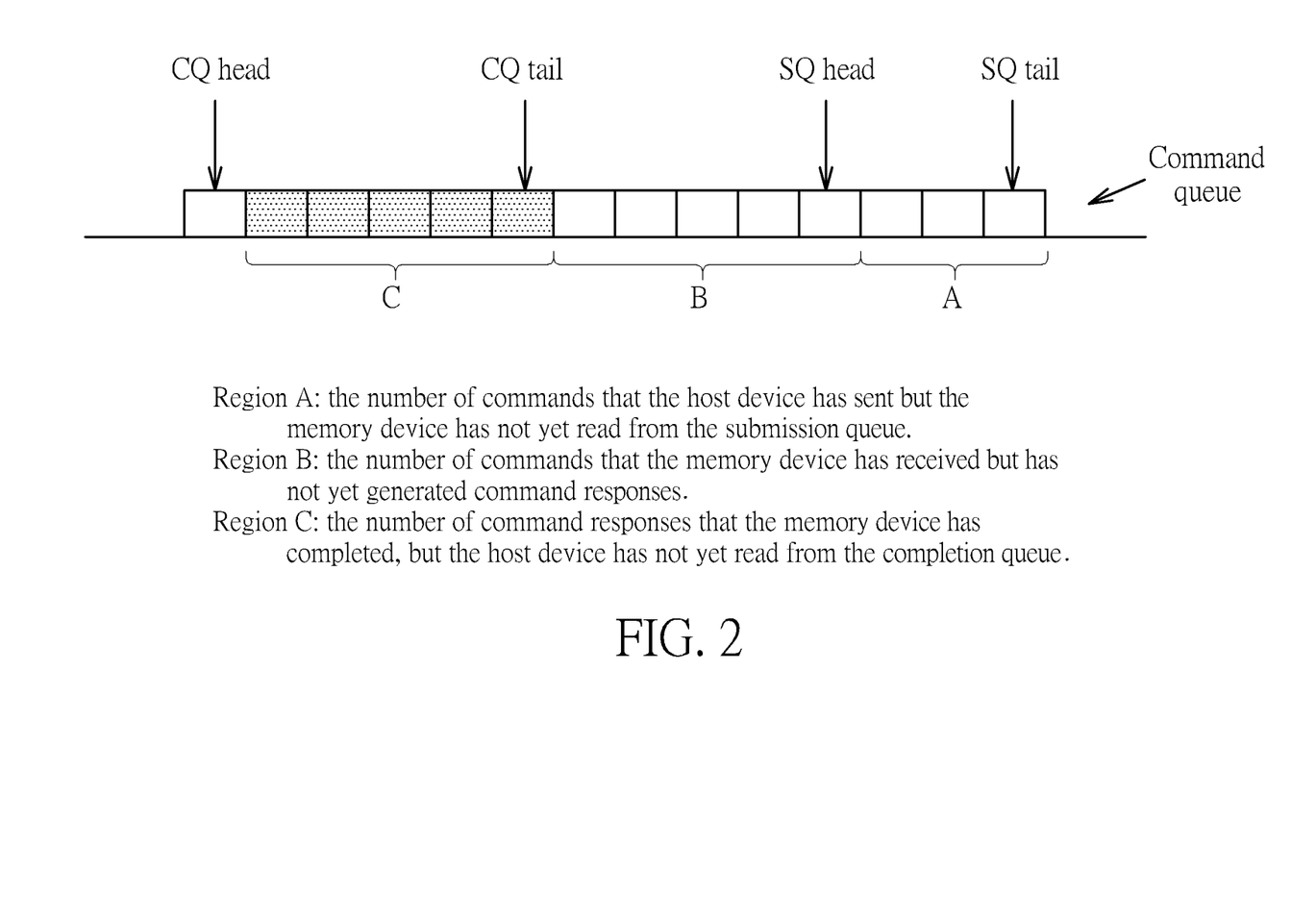
FIG. 2 is a diagram of a SQ tail, a SQ head, a CQ tail, a CQ head and the corresponding command queue according to one embodiment of the present invention.

In this embodiment, the host device 130 includes a command queue 191, a submission queue (SQ) 192 and a completion queue (CQ), where the command queue 191 is used to temporarily store commands that need to be sent to the memory device 100, such as read commands, write commands or some management commands that comply with a Non-Volatile Memory Express (NVMe) specification, etc. The submission queue 192 is used for the host device 130 to write the contents of the command queue 191 for the memory device 100 to read. The completion queue 194 is used for the memory device 100 to reply to the host device 130 about the command execution status. By using the submission queue 192 and the completion queue 194, the host device 130 can complete the access and management of the memory device 100. Specifically, in the process of using the submission queue 192 and the completion queue 194, the host device 130 and the memory device 100 will describe the processing status of the command and the completion status of the command by setting four parameters. Referring to FIG. 2, these four parameters are a submission queue tail (hereinafter referred to as SQ tail), a submission queue head (hereinafter referred to as SQ head), a completion queue tail (hereinafter referred to as CQ tail) and a completion queue head (hereinafter referred to as CQ head). The SQ tail is used to indicate how many commands the host device 130 sends, that is, if the host device 130 writes a command to the submission queue 192, the value of the SQ tail should be added with "1". The SQ head is used to indicate how many commands the memory device 100 has read from the submission queue 192, that is, if the memory device 100 reads a command from the submission queue 192, the value of the SQ head will be added with "1". The CQ tail is used to indicate how many commands the memory device 100 has completed and how many command responses have been written to the completion queue 194, that is, if the memory device 100 writes a command response to the completion queue 194, then the value of the CQ tail will be added with "1". The CQ head is used to indicate how many command responses the host device 130 has read from the completion queue 194, that is, if the host device 130 reads a command response from the completion queue 194, the value of the CQ head will be added with "1". It should be noted that the values of SQ tail, SQ head, CQ tail and CQ head can be reset at appropriate time.

Take an example to illustrate the process of the host device 130 sending a command to the memory device 100. First, the host device 130 writes the command into the submission queue 192. At this time, the host device 130 will add "1" to the internal SQ tail, and synchronize the SQ tail to the memory device 100 through a doorbell mechanism. Then, the memory device 100 can know that there is an unexecuted command in the submission queue 192 through the SQ tail, so the flash memory controller 110 in the memory device 100 reads the command from the submission queue 192 and add "1" to the SQ head. Then, the flash memory controller 110 executes the command, generates a command response after completing the command execution, writes the command response to the completion queue 194, and adds "1" to CQ tail. Finally, after receiving an interrupt signal from the memory device 100, the host device 130 will read the command response from the completion queue 194. At this time, the host device 130 will add "1" to the internal CQ head, and the CQ head is synchronized to the memory device 100 through the doorbell mechanism.

The values of SQ tail, SQ head, CQ tail and CQ head can be used to represent the command sequence number pointed to, and the current command processing status can be known through the SQ tail, SQ head, CQ tail and CQ head. For example, referring to FIG. 2, the region A between SQ tail and SQ head represents the number of commands that the host device 130 has sent but the memory device 100 has not yet read from the submission queue 192. The region B between SQ head and CQ tail represents the number of commands that the memory device 100 has received but has not yet generated command response (s). The region C between CQ tail and CQ head represents the number of command responses that the memory device 100 has completed, but the host device 130 has not yet read from the completion queue 194.

As mentioned in the prior art, since the flash memory controller 110 does not know the queue depth of the command queue 191, it cannot perform related performance optimization. In addition, as shown in FIG. 2, theoretically the queue depth of the command queue 191 can be obtained by subtracting the CQ head from the SQ tail. However, since the values of SQ head, CQ tail and CQ head will change rapidly during the command processing, the microprocessor 112 or other related circuits cannot accurately obtain the queue depth of the command queue 191 based on the SQ tail and CQ head. For example, in the prior art, the flash memory controller 110 immediately sends an interrupt signal to the host device 130 after writing a command response to the completion queue 194, and the host device 130 will immediately read the command response from completion queue 194 after receiving the interrupt signal. Therefore, the CQ head will quickly catch up with the CQ tail, that is, the values of CQ head and CQ tail will be the same most of the time, causing the number of commands corresponding to region C shown in FIG. 2 to not be accurately obtained. As mentioned above, since the number of commands corresponding to region C shown in FIG. 2 cannot be accurately obtained, it means that the queue depth of the command queue 191 cannot be accurately obtained by subtracting the CQ head from the SQ tail.

Therefore, one embodiment of the present invention proposes a control method of the flash memory controller 110, which can use an interrupt coalescing mechanism to delay the time when the flash memory controller 110 sends a command response, so that the CQ head will not quickly catch up with the CQ tail. Therefore, the microprocessor 112 or other related circuits can obtain the queue depth of the command queue 191 by subtracting the SQ tail from the CQ head.

Specifically, the microprocessor 112 can set a waiting time and/or a threshold value by setting the interrupt coalescing mechanism, wherein the waiting time refers to a time difference between the flash memory controller 110 sending two interrupt signals, that is, after the flash memory controller 110 sends an interrupt signal, it uses a timer to wait until the waiting time expires before it can send the next interrupt signal. In addition, when the number of commands executed by the flash memory controller 110 is higher than the threshold, the flash memory controller 110 will also send an interrupt signal to the host device 130.

In one embodiment, the waiting time is greater than the time length for the microprocessor 112 to complete executing multiple commands. For example, the microprocessor 112 may set the waiting time so that the waiting time is greater than the time required for the microprocessor 112 to complete four or five read/write commands.

Figure 3:
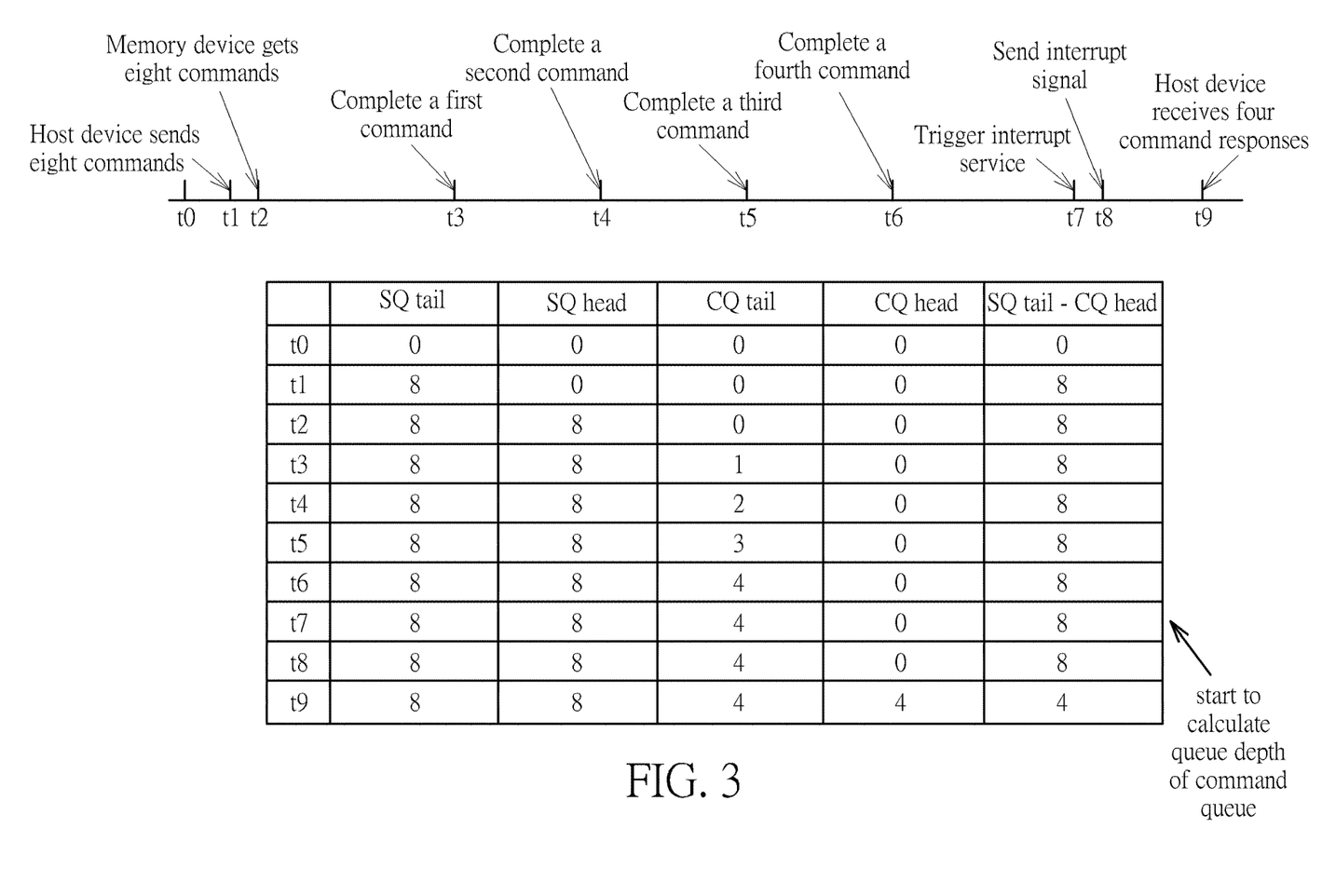
FIG. 3 shows an operation of the host device and the memory device according to one embodiment of the present invention.

Referring to the operations of the host device 130 and the memory device 100 shown in FIG. 3, at time t0, it is assumed that the current SQ tail, SQ head, CQ tail and CQ head are all "0". At time t1, the host device 130 writes eight commands to submission queue 192 from the command queue 191. At this time, the host device 130 updates the value of SQ tail to "8" and synchronizes the updated SQ tail to a register within the flash memory controller 110. At time t2, the flash memory controller 110 reads the eight commands from the submission queue 192, and the flash memory controller 110 updates the value of the SQ head to "8". Then, at time t3-t6, the microprocessor 112 in the flash memory controller 110 executes four commands in sequence, and generates corresponding command responses to the completion queue 194, and the value of CQ tail is updated accordingly. At time t7, since the time from t0 to t7 has reached the waiting time in the interrupt coalescing mechanism, the microprocessor 112 begins to calculate the queue depth of the command queue 191 based on the SQ tail and CQ head, that is, the microprocessor 112 subtracts the CQ head from the SQ tail to obtain a queue depth of "8" for the command queue 191. Then, at time t8, the microprocessor 112 sends an interrupt signal to the host device 130 to inform that there is a new command response in the completion queue 194. At time t9, the host device 130 reads four command responses from the completion queue 194 and updates the CQ head to "4".

Figure 4:
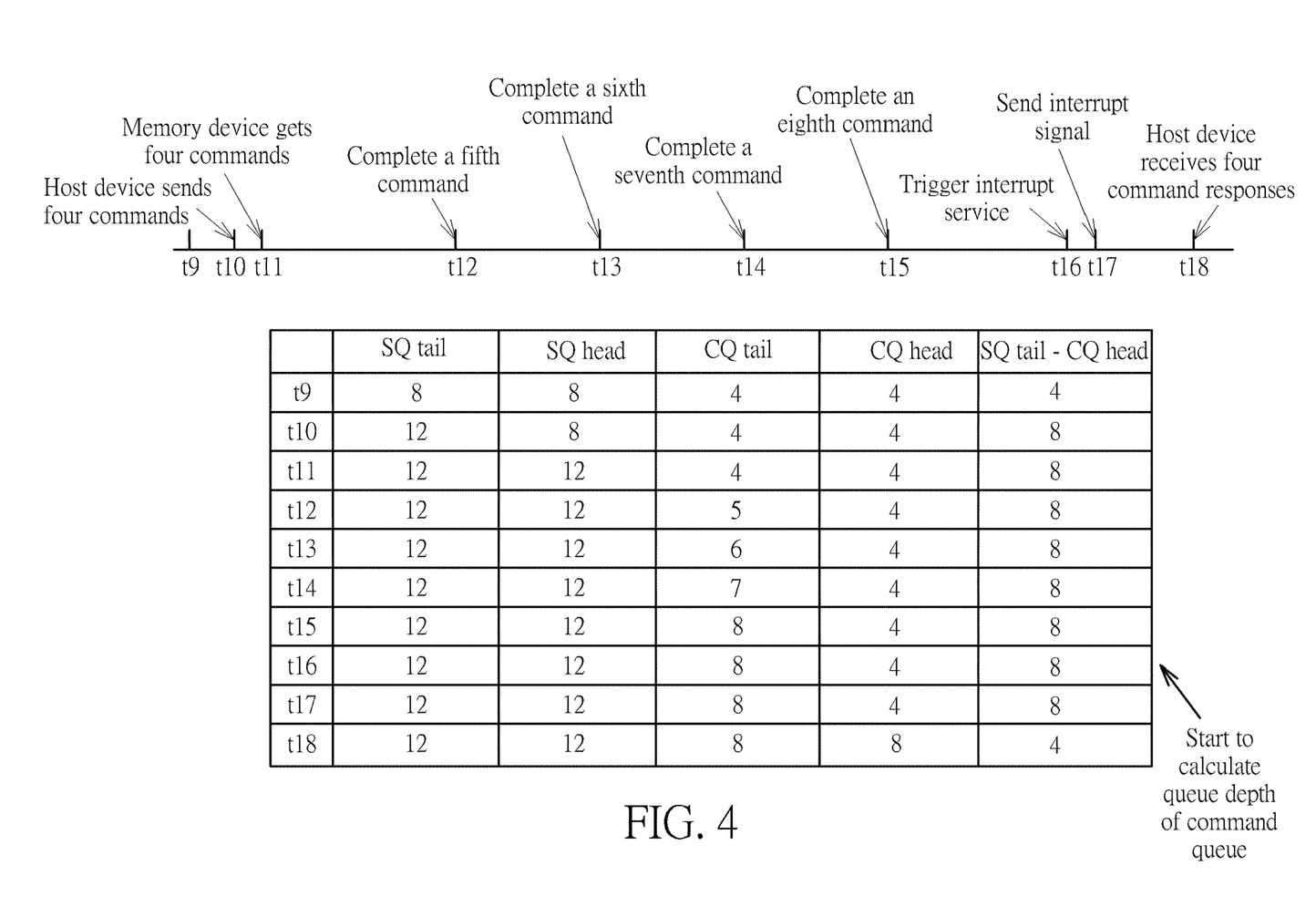
FIG. 4 shows an operation of the host device and the memory device according to one embodiment of the present invention.

Then, referring to FIG. 4, at time t10, since the queue depth of the command queue 191 is "8", and under the situation that four of the eight commands at time t1 have not yet been executed, the host device 130 will write only four commands to the submission queue 192 from the command queue 191. At this time, the host device 130 updates the value of SQ tail to "12" and synchronizes the updated SQ tail to the register within the flash memory controller 110. At time t11, the flash memory controller 110 reads four commands from the submission queue 192, and the flash memory controller 110 updates the value of the SQ head to "12". Then, at time t12-t15, the microprocessor 112 in the flash memory controller 110 executes four commands in sequence, and generates corresponding command responses to the completion queue 194, and the value of CQ tail is updated accordingly.

At time t16, since the time from t9 to t16 has reached the waiting time in the interrupt coalescing mechanism, the microprocessor 112 begins to calculate the queue depth of the command queue 191 based on the SQ tail and CQ head, that is, the microprocessor 112 subtracts the CQ head from the SQ tail to obtain a queue depth of "8" for the command queue 191. Then, at time t17, the microprocessor 112 sends an interrupt signal to the host device 130 to inform that there is a new command response in the completion queue 194. At time t18, the host device 130 reads four command responses from completion queue 194 and updates the CQ head to "8".

As mentioned above, when the host device 130 continues to send commands to the memory device 100, by using the method described in the above embodiment, the same value "8" can be obtained every time when the queue depth calculation is performed, so the queue depth can be calculated efficiently and accurately.

After determining the queue depth of the command queue 191 of the host device 130, the microprocessor 112 can optimize internal control according to the queue depth of the command queue 191. For example, after determining the queue depth of the command queue 191 of the host device 130, the microprocessor 112 can disable the interrupt coalescing mechanism. In one embodiment, if the command queue 191 of the host device 130 has a smaller queue depth, for example, the queue depth is less than a threshold value, the microprocessor 112 in the flash memory controller 100 can shorten the time it takes to send an interrupt signal after completing the command, that is, the microprocessor 112 will immediately send an interrupt signal to the host device 130 after writing the command response to the completion queue 194 to speed up the command processing of the host device 130. In addition, if the command queue 191 of the host device 130 has a larger queue depth, for example, the queue depth is greater than another threshold value, the microprocessor 112 in the flash memory controller 100 can increase the time it takes to send an interrupt signal to the host device 130 after completing the command, that is, the microprocessor 112 will delay for a period of time after writing the command response to the completion queue 194 before sending an interrupt signal to the host device 130.

Figure 5:
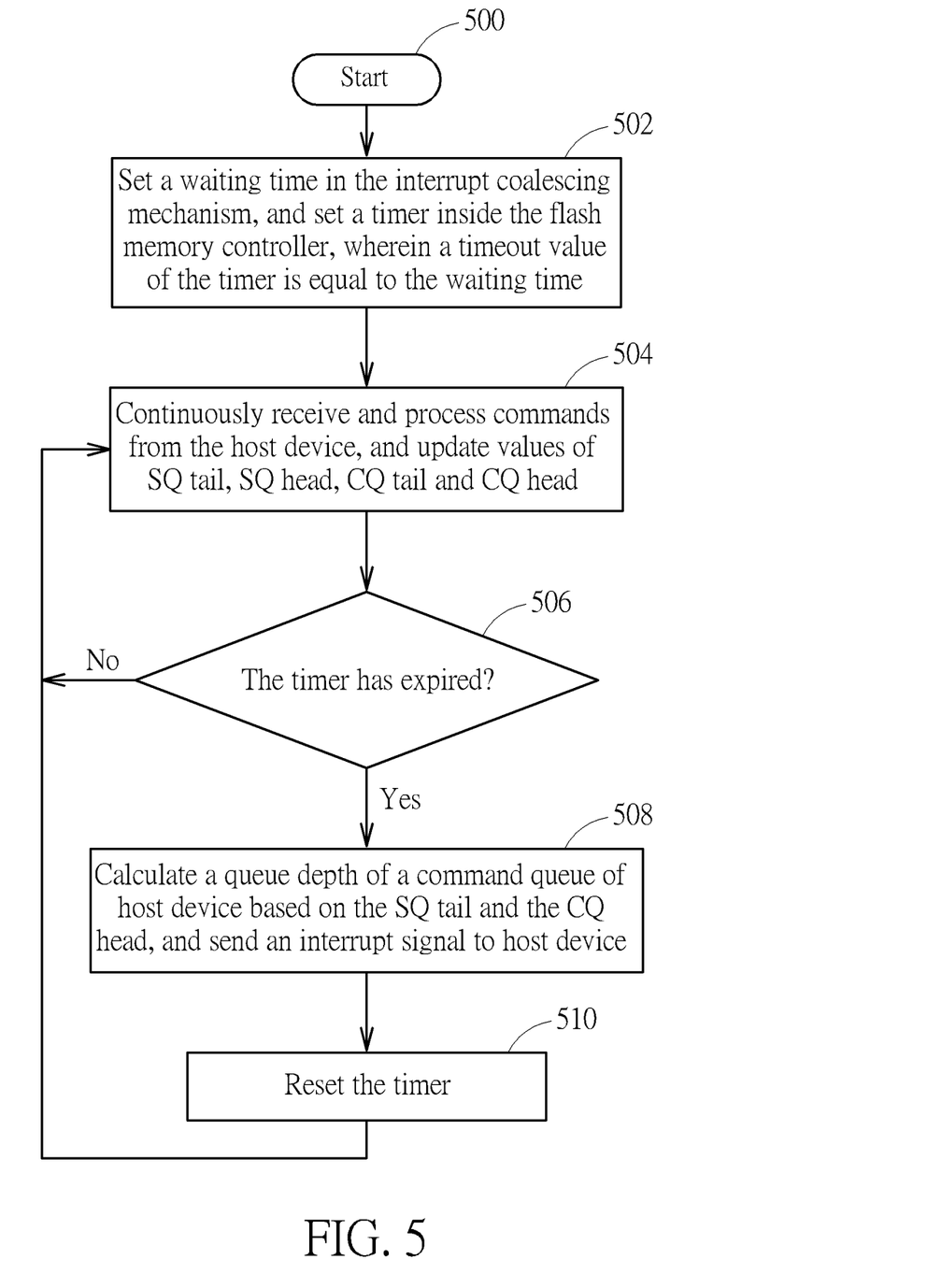
FIG. 5 is a flowchart of a control method of a flash memory controller according to one embodiment of the present invention.

The steps of calculating the queue depth of the command queue 191 described in the embodiments of FIG. 2-FIG. 4 above can be completed by the microprocessor 112 executing the program code 112C. FIG. 5 is a flowchart of a control method of a flash memory controller according to one embodiment of the present invention, wherein the flow is descried as follows.

Step 500: the flow starts.

Step 502: set a waiting time in the interrupt coalescing mechanism, and set a timer inside the flash memory controller 100, wherein a timeout value of the timer is equal to the waiting time.

Step 504: continuously receive and process commands from the host device, and update values of SQ tail, SQ head, CQ tail and CQ head.

Step 506: determine whether the timer has expired, if yes, the flow enters Step 508; and if not, the flow goes back to Step 504.

Step 508: calculate a queue depth of a command queue of host device 130 based on the SQ tail and the CQ head, and send an interrupt signal to host device 130.

Step 510: reset the timer, and the flow goes back to Step 504.

It should be noted that the process shown in FIG. 5 can be turned on/off through a setting. For example, when the memory device 100 is powered on, the flash memory controller 110 can execute the process shown in FIG. 5 to calculate the queue depth of a command queue of the host device 130, and then turn off this function to reduce power consumption.

Figure 6:
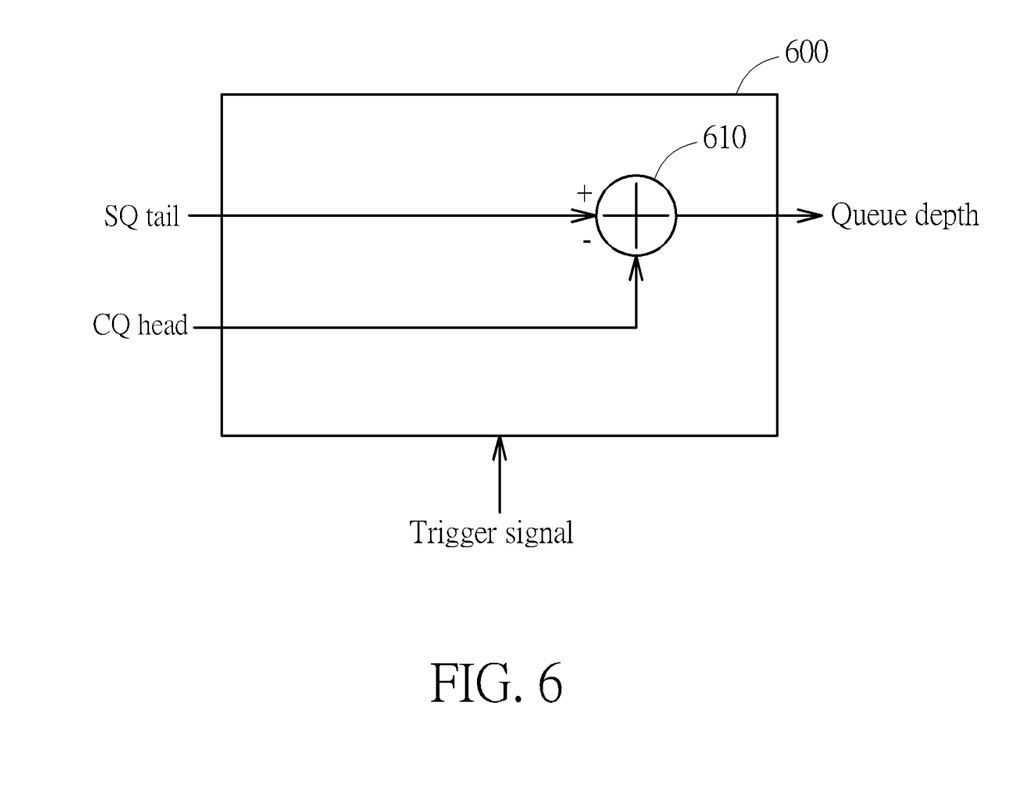
FIG. 6 is a diagram of a queue depth calculation circuit according to one embodiment of the present invention.

In another embodiment, the steps of calculating the queue depth of the command queue 191 described in the embodiments of FIG. 2-FIG. 4 above can be performed by arranging a queue depth calculation circuit in the interface logic 118. FIG. 6 is a diagram of a queue depth calculation circuit 600 according to one embodiment of the present invention. As shown in FIG. 6, the queue depth calculation circuit 600 comprises a subtractor 610, wherein the subtractor 610 subtracts the CQ head from the SQ head to obtain the queue depth of the command queue 191 according to a trigger signal, wherein the trigger signal is generated when a timer reaches a timeout value, and the timeout value is equal to a waiting time of an interrupt coalescing mechanism.

Figure 7:
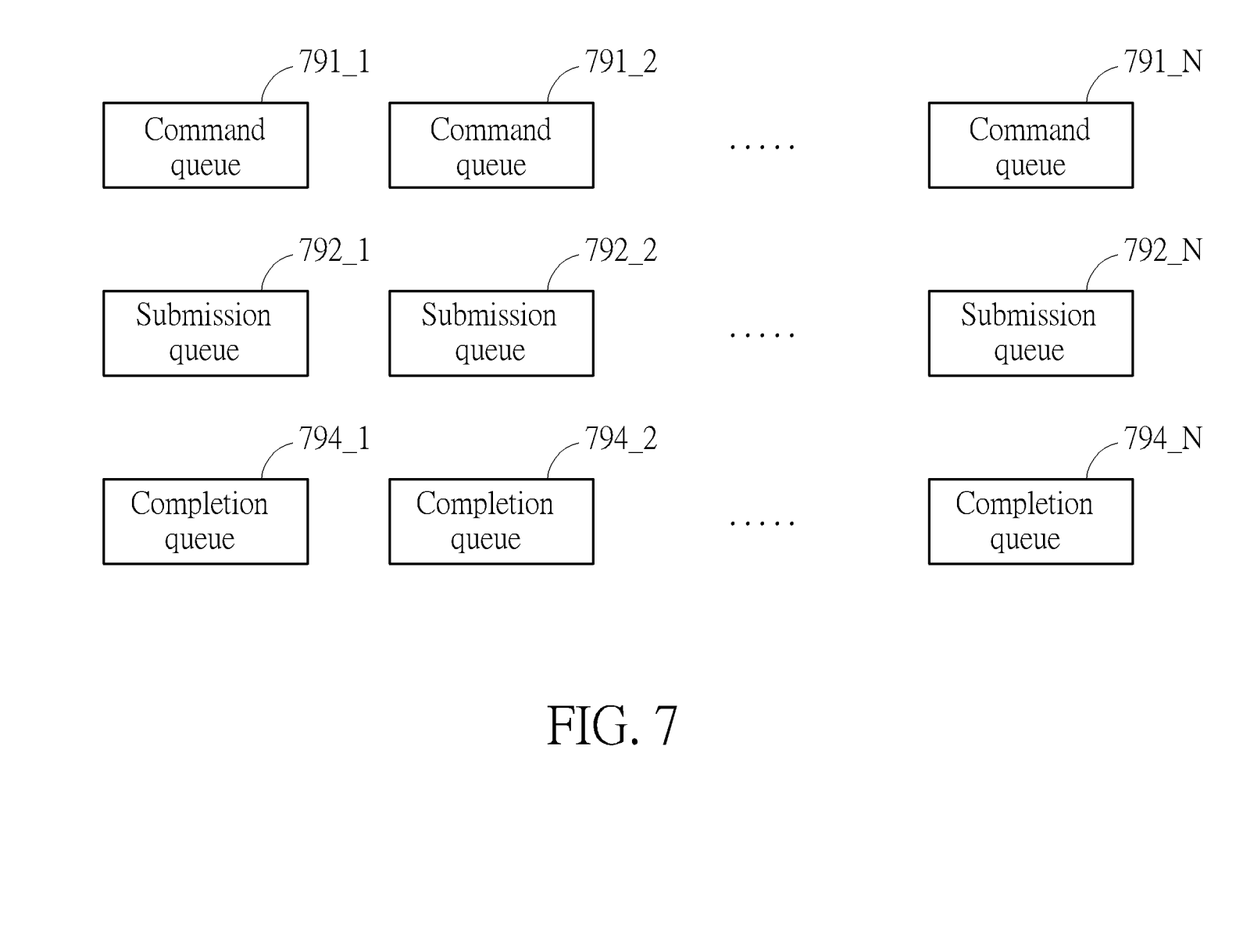
FIG. 7 is a diagram of a host device including multiple command queues and corresponding multiple submission queues and multiple completion queues according to one embodiment of the present invention.

In another embodiment of the present invention, as shown in FIG. 7, the host device 130 may include multiple command queues 791_1-791_N and corresponding multiple submission queues 792_1-792_N and multiple completion queues 794_1-794_N, where each set of submission queue and completion queue has corresponding SQ tail, SQ head, CQ tail and CQ head. For example, the submission queue 792_1 and completion queue 794_1 have corresponding SQ tail #1, SQ head #1, CQ tail #1 and CQ head #1, and the submission queue 792_2 and completion queue 794_2 have corresponding SQ tail #2, SQ head #2, CQ tail #2 and CQ head #2, and the submission queue 792_N and completion queue 794_N have corresponding SQ tail #N, SQ head #N, CQ tail #N and CQ head #N. In one embodiment, the microprocessor 112 can calculate the queue depth of each command queue 791_1-791_N according to the embodiments of FIG. 2-FIG. 6 above.

Figure 8:
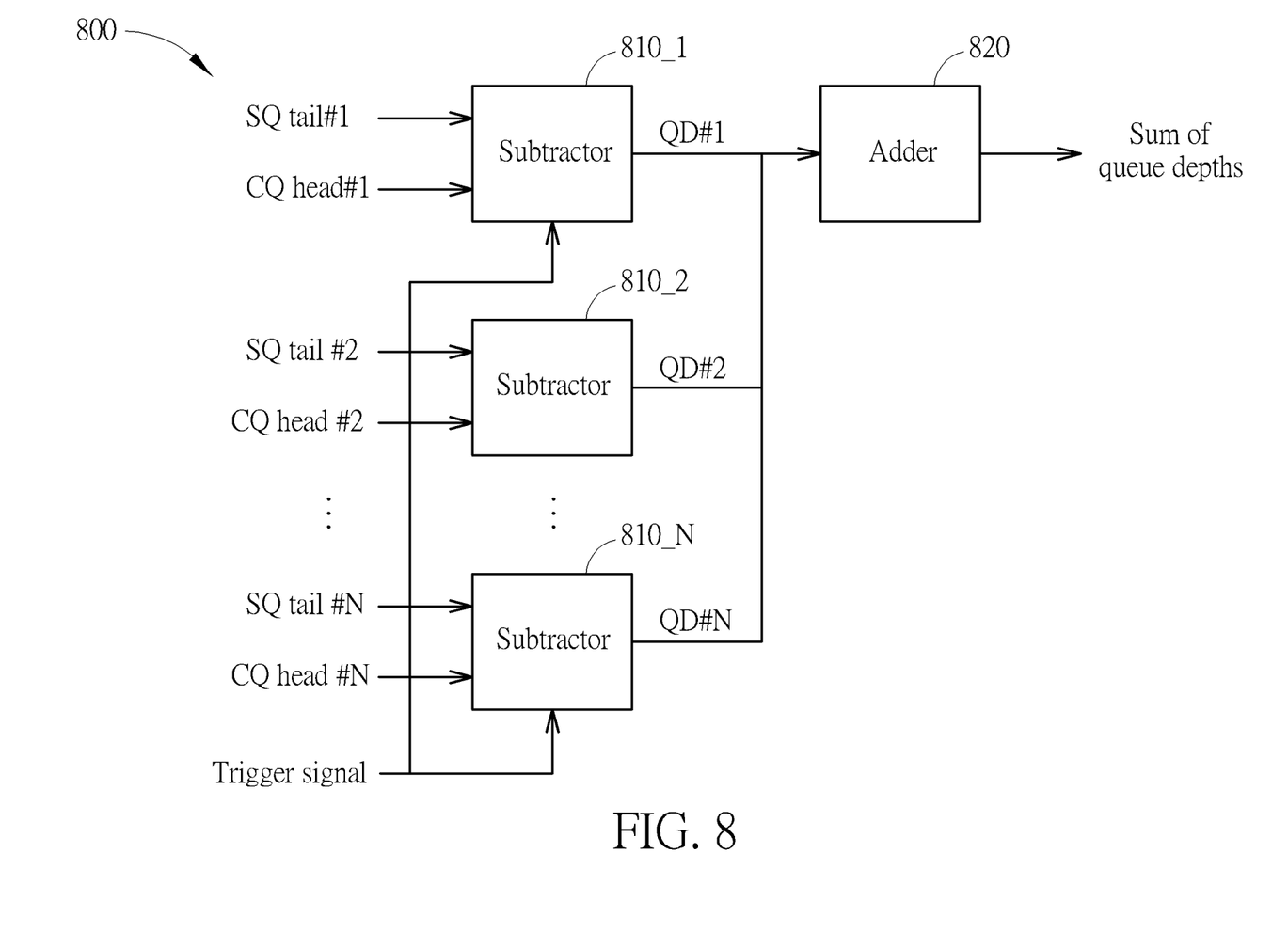
FIG. 8 is a diagram of a queue depth calculation circuit according to one embodiment of the present invention.

In one embodiment, the microprocessor 112 can calculate the sum of the queue depths of multiple command queues 791_1-791_N for subsequent management, or by setting a queue depth calculation circuit in the interface logic 118 to calculate the sum of the queue depths of multiple command queues 791_1-791_N. FIG. 8 is a diagram of a queue depth calculation circuit 800 according to one embodiment of the present invention. As shown in FIG. 8, the queue depth calculation circuit 800 comprises multiple subtractors 810_1-810_N and an adder 820. The subtractor 810_1 is used to subtract CQ head #1 from SQ tail #1 according to a trigger signal to obtain the queue depth QD #1 of the command queue 791_1. The subtractor 810_2 is used to subtract CQ head #2 from SQ tail #2 according to a trigger signal to obtain the queue depth QD #2 of the command queue 791_2. The subtractor 810_N is used to subtract CQ head #N from SQ tail #N according to a trigger signal to obtain the queue depth QD #N of the command queue 791_N. In one embodiment, the trigger signal is generated when a timer reaches a timeout value, and the timeout value is equal to a waiting time of an interrupt coalescing mechanism. The adder 820 is used to add the queue depths QD #1-QD #N of the command queues 791_1-791_N to obtain the sum of the queue depths of the command queues 791_1-791_N.

Briefly summarized, in the control method of the flash memory controller of the present invention, by setting the interrupt coalescing mechanism to delay/extend the time of sending the interrupt signal to the host device, the flash memory controller can accurately calculate the queue depth of the command queue inside the host device according to the SQ tail and CQ head, for the related settings of performance optimization.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A flash memory controller, wherein the flash memory controller is configured to access a flash memory module, and the flash memory controller comprises:
a read-only memory (ROM), configured to store a program code;
a microprocessor, configured to execute the program code to control access of the flash memory module;
wherein the microprocessor is configured to perform the steps of:
setting a waiting time in an interrupt coalescing mechanism, and setting a timer, wherein a timeout value of the timer is equal to the waiting time;
receiving multiple commands from a submission queue in a host device, processing the multiple commands to generate multiple command responses respectively, and writing the multiple command responses to a completion queue in the host device;
receiving a submission queue tail and a completion queue head from the host device, wherein the submission queue tail indicates how many commands the host device sends, and the completion queue head indicates how many command responses the host device has read from the completion queue;
when the timer reaches the timeout value, subtracting the completion queue head from the submission queue tail to obtain a queue depth of a command queue inside the host device; and
when the timer reaches the timeout value, sending an interrupt signal to the host device, wherein the interrupt signal is used to trigger the host device to read the multiple command responses from the completion queue.

2. The flash memory controller of claim 1, wherein the waiting time in the interrupt coalescing mechanism is greater than a time required for the microprocessor to complete execution of multiple read commands or multiple write commands.

3. The flash memory controller of claim 1, wherein the step of when the timer reaches the timeout value, sending the interrupt signal to the host device comprises:
sending the interrupt signal to the host device only when the timer reaches the timeout value; and before the timer reaches the timeout value, no interrupt signal is sent to the host device.

4. The flash memory controller of claim 1, wherein the step of when the timer reaches the timeout value, subtracting the completion queue head from the submission queue tail to obtain the queue depth of the command queue inside the host device comprises:

when the timer reaches the timeout value, controlling a queue depth calculation circuit to subtract the completion queue head from the submission queue tail to obtain the queue depth of the command queue inside the host device.

5. The flash memory controller of claim 1, wherein the microprocessor is further configured to perform the steps of:

controlling a time for the microprocessor to send the interrupt signal to the host device when processing subsequent commands based on the calculated queue depth of the command queue.

6. A control method of a flash memory controller, comprising:

setting a waiting time in an interrupt coalescing mechanism, and setting a timer, wherein a timeout value of the timer is equal to the waiting time;

receiving multiple commands from a submission queue in a host device, processing the multiple commands to generate multiple command responses respectively, and writing the multiple command responses to a completion queue in the host device;

receiving a submission queue tail and a completion queue head from the host device, wherein the submission queue tail indicates how many commands the host device sends, and the completion queue head indicates how many command responses the host device has read from the completion queue;

when the timer reaches the timeout value, subtracting the completion queue head from the submission queue tail to obtain a queue depth of a command queue inside the host device; and when the timer reaches the timeout value, sending an interrupt signal to the host device, wherein the interrupt signal is used to trigger the host device to read the multiple command responses from the completion queue.

7. The control method of claim 6, wherein the waiting time in the interrupt coalescing mechanism is greater than a time required for the flash memory controller to complete execution of multiple read commands or multiple write commands.

8. The control method of claim 6, wherein the step of when the timer reaches the timeout value, sending the interrupt signal to the host device comprises:

sending the interrupt signal to the host device only when the timer reaches the timeout value; and before the timer reaches the timeout value, no interrupt signal is sent to the host device.

9. The control method of claim 6, wherein the step of when the timer reaches the timeout value, subtracting the completion queue head from the submission queue tail to obtain the queue depth of the command queue inside the host device comprises:

when the timer reaches the timeout value, controlling a queue depth calculation circuit to subtract the completion queue head from the submission queue tail to obtain the queue depth of the command queue inside the host device.

10. The control method of claim 6, wherein the microprocessor is further configured to perform the steps of:

controlling a time for the flash memory controller to send the interrupt signal to the host device when processing subsequent commands based on the calculated queue depth of the command queue.

* * * * *